ued States [11] 3,598,467

[72] Inventor Durk Jon Pearson
 Palos Verdes Estates, Calif.
[21] Appl. No. 811,432
[22] Filed Mar. 28, 1969
[45] Patented Aug. 10, 1971
[73] Assignee TRW Inc.
 Redondo Beach, Calif.

[54] FIBER OPTIC DIFFUSER FOR HOLOGRAPHY
 2 Claims, 15 Drawing Figs.
[52] U.S. Cl............................................. 350/3.5,
  350/96, 350/171
[51] Int. Cl......................................... G02b 27/00,
  G02b 5/02, G02b 5/16
[50] Field of Search................................ 350/3.5, 96;
  331/94.5

[56] References Cited
 UNITED STATES PATENTS
 3,255,357  6/1966  Kapany et al............. 350/96
 3,405,614  10/1968  Lin et al................... 350/3.5
 OTHER REFERENCES
 Hioki et al. Japanese Journal Of Applied Physics, Vol. 4, 1965, p. 817 (copy in 350/3.5)

Caulfield et al., Applied Optics, Vol. 6, No. 7, July 1967, p. 1272 (copy in 350/3.5)

Primary Examiner—David Schonberg
Assistant Examiner—Ronald J. Stern
Attorneys—Daniel T. Anderson, Edwin A. Oser and Jerry A. Dinardo ABSTRACT: A holographic apparatus capable of utilizing a pulsed laser developing an incompletely coherent light beam for recording holograms. The apparatus makes use of a bundle of transparent fibers used as a new optical element. This fiber bundle serves both the purpose of directing the light toward the object to be recorded and of scrambling or diffusing the light from the source. Essentially each fiber of the fiber bundle creates a cone of light which illuminates substantially the entire object. As a result, at the recording material for the hologram there is at least a component or portion of the scene beam capable of interfering with a component of the reference beam. The fiber bundle also makes it possible to direct the light beam around obstacles or close to an object for holograhic microscopy or for taking holograms of an object in a hostile environment such as a rocket engine generating a great amount of heat. The holograms may be made both of objects in reflection and in transmission.

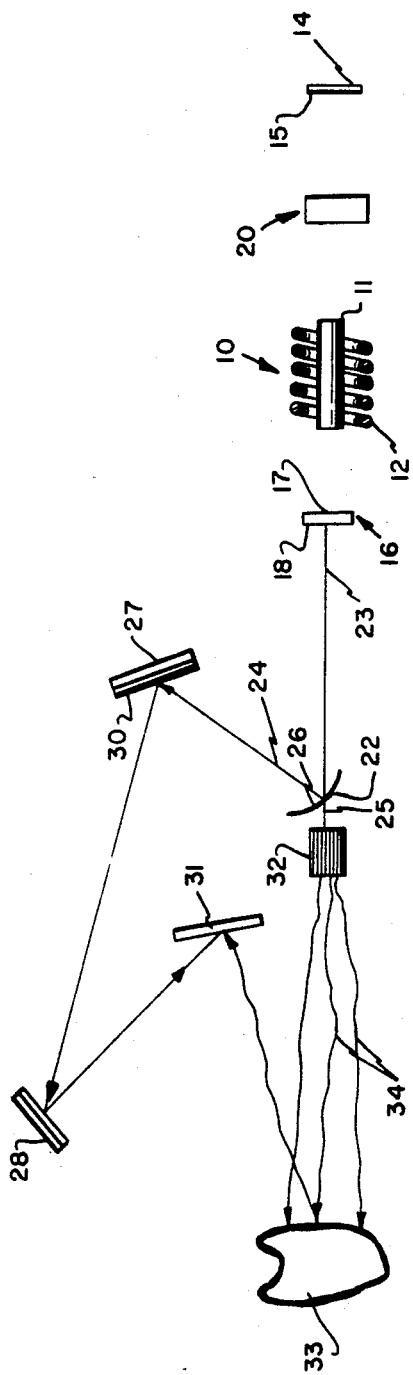
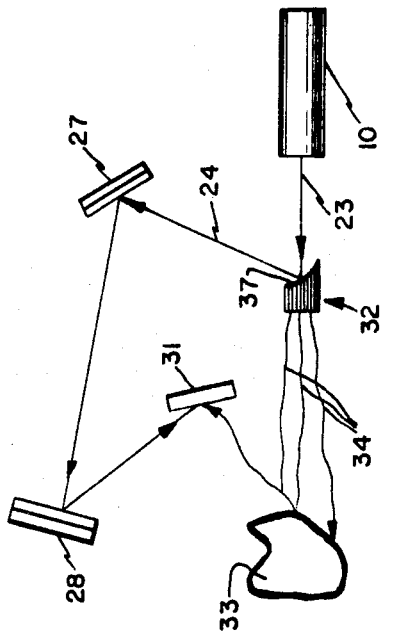
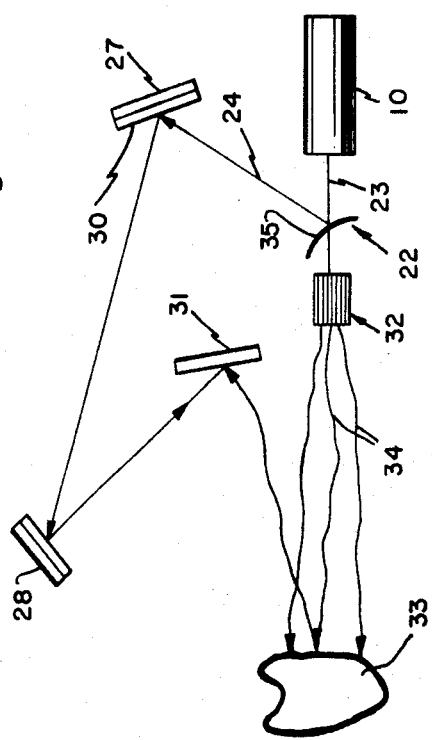
Fig.1
Fig.2
Fig.3
Durk J. Pearson
INVENTOR

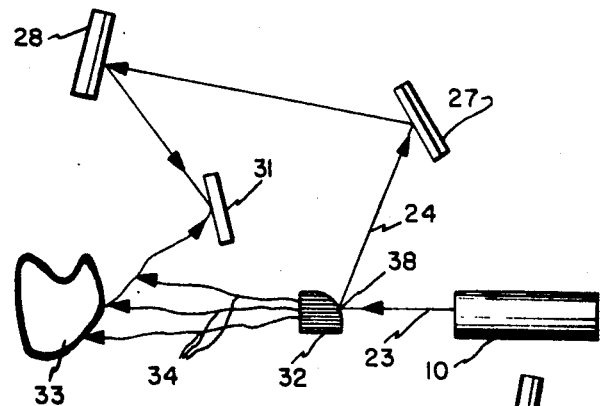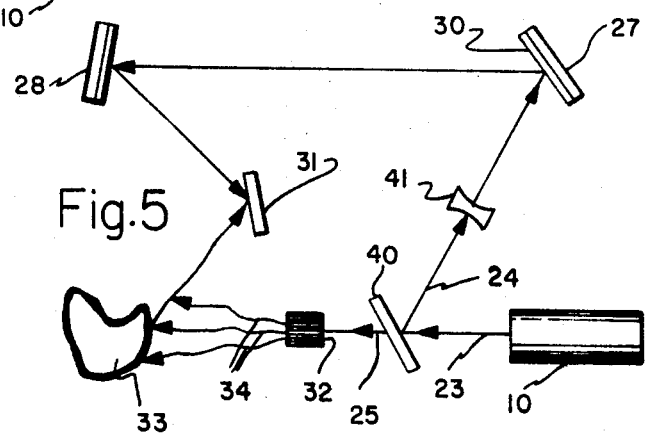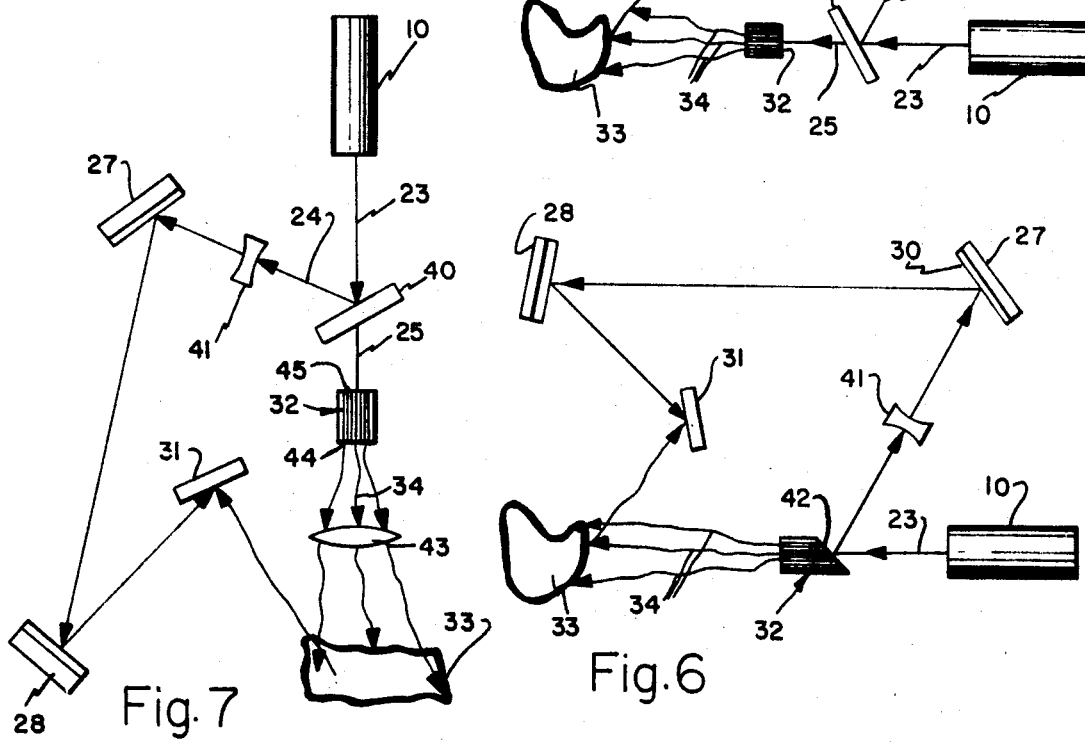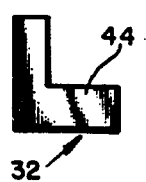

Durk J. Pearson
INVENTOR

ATTORNEY

Durk J. Pearson
INVENTOR.

3,598,467

FIBER OPTIC DIFFUSER FOR HOLOGRAPHY

CROSS-REFERENCE TO RELATED APPLICATION

The present application is related to a copending application to Charles H. Ernst and Martin D. Cowley, entitled "Holographic Apparatus Utilizing a Pulsed Laser" filed on Nov. 21, 1968, Ser. No. 777,852 and assigned to the assignee of the present application. The present application may be considered in the nature of an improvement over the Ernst et al. application referred to.

BACKGROUND OF THE INVENTION

This invention relates generally to holography and particularly relates to a holographic apparatus providing improved amplitude and phase distribution of the light, better illumination of an object and holographic microscopy or holography in hostile environments.

In order to obtain good holograms either of action scenes or to obtain holograms of a subject by reflected light it is necessary to have a very high light intensity. Unfortunately at this time gas lasers do not develop a light beam with the necessary intensity. On the other hand, the light beam from a gas laser has excellent coherence, both spatial and temporal. Nevertheless, due to the relatively low intensity of a gas laser, exposure times are on the order of seconds. During this time the entire equipment must be maintained vibration-free within approximately one-tenth of a wavelength. The temporal coherence of a laser has to do with the path length of the two beams which are made to interfere with each other. This can generally be obtained by careful matching of the path length of the reference and scene beams. On the other hand, spatial coherence has to do with the coherence across a cross section of the light beam and is more difficult to obtain.

On the other hand, a light beam from a solid laser generally has much higher light intensity. This is particularly true of a pulsed laser, an example of which is a ruby laser. Since the power is only generated during a short fraction of the time, which may be as short as milliseconds to nanoseconds, the solid material and other elements of the laser are capable of withstanding the high light intensity and temperatures encountered. Accordingly solid-state lasers and particularly pulsed lasers such as ruby lasers are ideally suited for holography. Since a pulsed laser generates a very intense light beam for only a very short period of time, for example, 100 nanoseconds, it is particularly suitable for taking action pictures of phenomena which change rapidly with time.

However, on the other hand, coherence of the light beam particularly of a pulsed ruby laser is not as good as required to obtain high-quality holograms, particularly in reflection. It is known, for example, that the cross section of the light beam obtained from a ruby laser is of nonuniform intensity distribution. This nonuniform light intensity across the cross section of the light beam furthermore varies as a function of time. It is believed that this is due to the fact that individual filaments of the ruby rod lase independently of each other. Thus, one filament may start to lase before another filament does. Or else one filament may decay before the others do. The result is that the light intensity is not uniform and continuously varies across the cross section of the laser.

It is believed at this time that this is due to nonuniformities of the ruby crystal. These nonuniformities or defects cause variations of various physical constants such as the index of refraction and the like.

For this and other reasons it has been found to be extremely difficult to obtain holograms, particularly of extended objects where the hologram is made by reflecting the light beam from the object. One of the reasons is that coherence of the laser is insufficient to permit interference patterns between a scattered scene beam and the reference beam which may have considerably different light paths.

In the copending application to Ernst et al. above referred to, it has been proposed to utilize a light diffuser interposed into the path of the scene beam. While such a light diffuser substantially improves spatial coherence and the amplitude distribution of the light beam, it does have certain disadvantages for certain applications. For example, a light diffuser will scatter the light substantially in all directions. Accordingly, only a portion of the original light of the laser will impinge upon the object with a resulting loss of light. Another problem is that the light diffuser cannot be used conveniently for holographic microscopy. Thus a ground glass diffuser should be placed a fraction of an inch away from the object or speckle in the illumination may mask small details. This however, is inconvenient in most cases. In addition, there is a severe loss of resolution due to the coarseness of the coherence speckle pattern which exists at some distance from the diffuser. If the diffuser is imaged on the object by the lens system, a great deal of light is usually lost. Additionally, the image of the diffuser and accordingly, the coarseness of the speckle is also magnified on the plane of the object.

It is, accordingly, an object of the present invention to provide holographic apparatus featuring improved spatial coherence and improved amplitude distribution of the light without the disadvantages of a conventional ground glass diffuser.

Another object of the present invention is to provide holographic apparatus which permits holographic microscopy without the disturbing effect of the speckle caused by a conventional diffuser.

A further object of the present invention is to permit holography of an object in a hostile environment such, for example, as high temperatures or the like, while still directing substantially all of the light onto the object so as to minimize the loss of light.

SUMMARY OF THE INVENTION

In accordance with the present invention there is provided holographic apparatus having improved spatial coherence and substantially uniform amplitude distribution. The apparatus comprises a light source for generating a beam of substantially monochromatic light. Preferably this may be a laser. As will be more fully explained hereinafter, the laser may be of the pulsed type such as a ruby laser having at least one mode selector to obtain a light beam of substantially a single frequency.

A recording material, such for example, as a photographic plate or film is disposed in a predetermined plane for recording a hologram of an object to be recorded. Means are provided for splitting the beam of light into a reference beam and a scene beam. Furthermore, the reference beam is directed onto the recording material in any suitable manner.

Finally, there is provided a bundle of transparent fibers. This bundle is interposed into the path of the scene beam. It serves the purpose of diffusing or scattering the light from the source and for directing the light onto the object. Preferably the bundle of transparent fibers is of the type used conventionally for fiber optics. Each of the fibers preferably has a small diameter so that the bundle may be bent around obstacles. The light emerges from each fiber in the form of a small light cone. Preferably, each of these cones substantially illuminates the object to be recorded. This makes it possible to permit interference of light of at least one component or portion of the scene beam with a component of the reference beam and at every point of the hologram.

This is made possible because it is well known that a hologram is very insensitive to background illumination. For example, the intensity of the incoherent background when making a hologram may be anywhere from 10 to 100 times as large as the coherent light intensity needed to make the hologram by itself without great loss of quality. Accordingly if, say 1 percent to 10 percent of the light of the light beam is coherent and of the uniform amplitude, it is feasible to obtain a hologram even though the ruby rod of the laser is not of the highest quality.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a schematic representation of a holographic apparatus in accordance with the present invention, including a solid laser having two mode selectors, a lens serving both as a beam splitter and an enlarging lens for the reference beam, and a fiber bundle for the scene beam for obtaining a hologram in reflected light;

FIG. 2 is a schematic showing of a holographic apparatus similar to that of FIG. 1, but showing a combination lens and beam splitter operating as a diverging lens for the reference beam;

FIG. 3 is a schematic representation of another embodiment of the invention generally similar to that of FIG. 1 but utilizing a fiber bundle having a ground, concave face serving as a beam splitter and diverging lens for the reference beam;

FIG. 4 is a schematic representation of a holographic apparatus similar to that of FIG. 3 but showing a fiber bundle having a convex face serving as a beam splitter and a diverging lens for the reference beam;

FIG. 5 is a schematic representation of another holographic apparatus embodying the present invention and utilizing a separate beam splitter and diverging lens for the reference beam;

FIG. 6 is a schematic representation of a further embodiment of a holographic apparatus of the invention utilizing a polished, inclined face of the fiber bundle as a beam splitter for the reference beam;

FIG. 7 is a schematic representation of still a further holographic apparatus for taking holograms in reflected light, generally similar to the apparatus of FIG. 5, but including an additional lens to focus the face of the fiber bundle near the surface of the object;

FIG. 8 is a front elevational view of the one of the faces of the fiber bundle of the apparatus of FIG. 7 to illustrated that the fiber bundle may be shaped like the object in cross section;

DESCRIPTION OF THE PREFERRED EMBODIMENT

Figure 9:
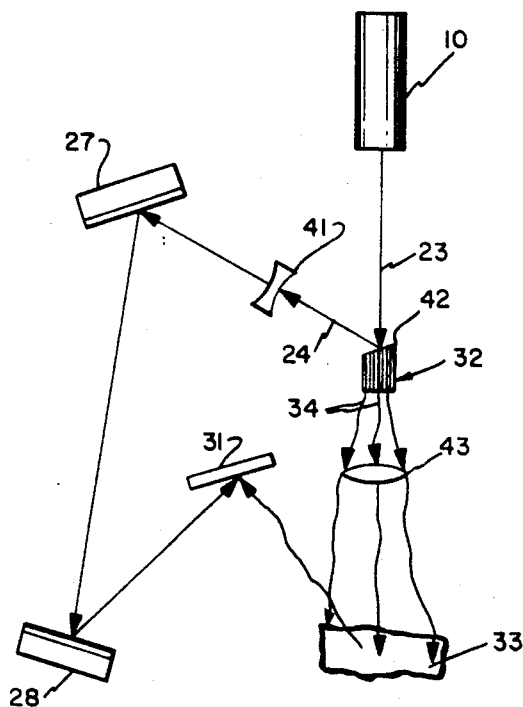
FIG. 9 is a schematic representation of a holographic apparatus similar to that of FIG. 7 but having an inclined polished surface of the fiber bundle to serve as a beam splitter.

Referring now to the drawings, wherein like elements are designated by the same reference characters, and particularly to FIG. 1 there is illustrated a holographic arrangement in accordance with the present invention. The apparatus of FIG. 1 may use any monochromatic light source such a mercury discharge tube containing only a single stable mercury isotope with the atomic weight 198. Preferably, however, the apparatus of FIG. 1 includes a laser 10. The laser 10 may include, for example, a solid rod 11 of a laserable material such, for example, as a ruby rod. Surrounding the ruby rod 11 is a flashlamp 12 which may, for example, have a few helical turns about the ruby rod 11 and which serves the purpose to pump the atoms or molecules of the laserable material into an upper excited level. A resonant cavity surrounding the ruby rod 11 is formed by a reflector or mirror 14 which may, for example, be totally reflecting and which may have a reflecting front surface 15 facing the ruby rod 11.

There is further provided a second reflector 16 which is only partly reflecting and which preferably is a resonant reflector. Thus, the reflector 16 may have reflecting surfaces 17 and 18 as shown on opposite sides. This may conveniently consist of a Fabry-Perot etalon with two or more spaced, reflecting surfaces. Such resonant reflectors are conventional and well known in the art. They can be made in such a manner that they operate as a mode selector or frequency filter with reflectance rapidly varying, or changing considerably with a wavelength change on the order of one-twentieth of an angstrom unit (A.U.).

A second mode selector 20 may optionally also be disposed in a resonant cavity formed by the reflectors 14 and 16. The second mode selector 20 may be a cell with transparent walls for containing a suitable dye. This dye should be normally opaque to the light of the laser. For example, a ruby laser develops a light beam at a wavelength of 6,943 A.U. Furthermore the dye should be in the nature of a photochromic material, that is, it should bleach or become transparent when the light intensity exceeds a certain value. Such dyes change states extremely fast and will switch or change from the opaque to the transparent state in a period on the order of $10^{12}$ seconds. Such a dye is obtainable from Eastman Kodak under the name of cryptocyanine. The dye has a molecular weight of approximately 480.39 and has the following formula:

$C_6H_4N(C_2H_5)(I)=CHCH=CCH=CHCH=CCH=CHN(C_2H_5)C_6H_4$
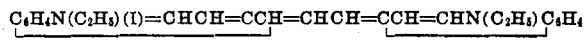

This dye may be dissolved in various chemicals such as methanol ($CH_3OH$), ethanol ($CH_2H_5OH$) or acetonitrile ($CH_3CH$). However it should be pointed out that such dyes and their composition are well known in the art and their operation as mode selectors is well understood.

It has been found that superior holograms are obtainable with a laser of the type shown in FIG. 1 at 10 including two mode selectors 16 and 20. However either the mode selector 20 consisting of a fast bleaching dye or the mode selector 16 consisting of a resonant reflector of the Fabry-Perot type could be omitted and acceptable holograms in reflections are obtainable by means of such a laser. It is still possible to obtain holograms by omitting both mode selectors but their quality is inferior.

It may be mentioned in passing that the ruby rod 11 is of the quality called "select interference quality." It will be understood that this is not the best obtainable quality and hence, that the ruby rod 11 is relatively inexpensive. The distance between the two reflectors 14 and 16 may be on the order of 1.5 meters. The ruby rod itself may be ½ inch by 3¾ inches.

However in spite of the provisions of one or two mode selectors, the laser 10 does not produce completely coherent light. Apparently only a fraction of the light which is obtained from the laser is capable of interfering with another fraction of the light of the same beam. Furthermore it is well known as pointed out previously that a cross section of the beam obtainable from such a laser has phase and amplitude variations across the beam which may be due to imperfections of the crystal. It should be clearly stated at this time that the precise operation of laser is not known and that any theories advanced herein concerning the holographic apparatus of the invention are only tentative. While superior results have been obtained with each embodiment shown in the drawings, a complete theory explaining all observable facts is not available at present.

Turning now to the holographic apparatus proper this includes an element 22 which operates as a beam splitter and lens. The element 22 may be a relatively thin, concave-convex lens such as a watchglass of a low-powered meniscus lens. Accordingly, it splits the initial laser beam 23 which emerges from the laser 10 into a reflected reference beam 24 and a transmitted scene beam 25. The lens 22 is so arranged that its concave face 26 faces the laser 10. It first focuses the reference beam 24 which subsequently becomes defocused. Accordingly, the lens and beam splitter 22 operates as a beam diverger.

The reflected reference beam 24 is therefore increased in diameter. The reference beam 24 is subsequently reflected twice by a pair of reflectors or mirrors 27 and 28. These mirrors preferably are front-reflecting mirrors. That is, the surface 30, for example of the mirror 27 is the one which reflects the beam. This avoids any problems which may occur due to a second reflection of the light beam at the front surface of a rear surface mirror.

The reference beam 24 which has been twice reflected by the end reflectors 27 and 28 then impinges on a recording material 31 for recording the hologram. This may be any suitable material, such for example as a photographic plate or film or else a suitable photochromic material.

In accordance with the present invention the scene beam 25 is passed through a bundle 32 of relatively small fibers before it impinges on the object 33 from which it is reflected onto the recording material 31. The bundle 32 consists of a substantial number of preferably flexible fibers of transparent material such as glass or a suitable plastic. Preferably each fiber is coated or clad with another transparent material so as to facilitate the reflection of the light along each fiber. The reflection of the light depends on the angle of incidence and on the relative refractive indices of the two media forming the core and the outer cladding or else the interface between the fiber and air. Such bundles of transparent fibers are conventional and are well known in the art. In some cases where little resolution is required a few dozen fibers may suffice. In general, however, a bundle may consist of a large number of fibers such for example, as 10,000. This is particularly true of microscopic applications and where a large resolution is needed. The fibers of the bundle 32 may be aligned in parallel to each other or not.

As a result, the light beam 34 emerging from the fiber bundle 32 is scattered or scrambled. Thus if the fibers are not parallel to each other the light paths of adjacent light beams each passing through another fiber are generally different. Alternatively, if the fibers are parallel to each other, each fiber may be considered as a light source from which the light emerges. However, due to the geometry of the fibers and their cladding, a small-angle cone of light will emerge from each fiber. These cones of light will mix with each other so that the light becomes scrambled. Preferably the arrangement is such that each cone of light emerging from one of the fibers illuminates substantially the entire surface of an object 33 and consequently illuminates the entire surface of the recording material 31.

Therefore it may be said that the fiber bundle 32 operates essentially as a light diffuser without however the disadvantages of a conventional light diffuser. Thus the light is directed in a forward direction rather than being scattered in all directions. This, of course, makes it possible to concentrate the light more efficiently on the object to be recorded. It also makes it possible to use cheaper lenses because the quality of the lenses is of less importance as long as the light is scattered or mixed. Furthermore, as will subsequently be shown, the use of a bundle of fibers makes it possible to take holograms in hostile areas where, for example, the temperatures are high or corrosive atmospheres exist. The light may be lead or conducted through constricted areas or passed around obstacles. It also makes possible holographic microscopy because it is now more conveniently possible to place the light diffuser close to the object or to image its output face near the subject without the great light loss and increase in speckle attendant to the use of a conventional diffuser.

The complete action and operation of such a light diffuser is not completely understood. However the following theories are tentatively given at this time. In the first place, the light diffuser or fiber bundle 32 preferably interposed into the path of the unenlarged scene beam serves the purpose of mixing or averaging the amplitude of the light of the laser beam. This tends to average out variations of the light intensity across the beam which normally exist with the type of laser described herein.

It is believed that this also tends to substantially minimize or eliminate the effects of interference of different light beams of slightly different frequency or phase with each other. This shows up on many holograms as dark areas or streaks, sometimes referred to as "worms." These are believed due to the fact that adjacent bundles of light may have slightly different frequencies or phases and hence, tend to interfere with each other to create light and dark areas in space which eventually are recorded on the hologram. The effects of such slight frequency or phase variations are again averaged by the use of a light diffuser. Thus the light diffuser permits interference of adjacent light beams with slightly different path lengths to average out variations of light intensity due to interference or diffraction phenomena. This may be considered to be an averaging of differences of phases and amplitudes of adjacent bundles of light.

Finally there is believed to be a thorough mixing of the adjacent light bundle of the laser beam. This, coupled with the fact that the light is again scattered by the object 33, permits interference of light of at least one component or portion of the scene beam with at least a coherent component or portion of the reference beam at every point of the hologram. This is true regardless of whether all the light from the laser is in spatial coherence or not. All that needs to be assumed is that a fraction, which may be as small as 1 percent, of the light is in true coherence. However it should be emphasized again that a complete theory explaining all observed facts cannot be offered at this time.

It should be noted that no attempt has been made in the drawings to show that the path length of the reference beam 24 is made to equal that of the scene beam 25, which is generally done for best results.

Referring now to FIG. 2 there is shown a holographic apparatus which is generally similar to that illustrated in FIG. 1. The laser 10 shown schematically in FIG. 2 may be the same as that shown and discussed in connection with FIG. 1. However, in FIG. 2 the combination lens and beam splitter 22 has been arranged so that its convex face 35 faces the laser 10. Accordingly, the lens 22 will again operate as a diverging lens having a negative focal point, that is, a focal point on the other side of the convex face 35. It will therefore be apparent that it makes no difference whether the lens 22 is arranged with its concave face 26 facing the laser or with its convex face 35 facing the laser. In either case it operates as a beam splitter and as a diverging lens for the reference beam 24.

Referring now to FIG. 3 there is illustrated another holographic apparatus of simplified construction. Here the lens and beam splitter 22 has been omitted. Instead the face 37 of the fiber bundle 32 has been ground concave and polished. Accordingly, the fiber bundle 32 operates as a light diffuser, a beam splitter and a diverging lens for the reference beam. In other words, the action of the concave face 37 of the fiber bundle 32 is essentially the same as that of the concave face 28 of the lens 22 of FIG. 1.

As alternative arrangement has been illustrated in FIG. 4 to which reference is now made. Here the face 38 of the fiber bundle 32 facing the laser 10 has been ground and polished to be convex rather than concave. Accordingly its action is similar to that of the convex face 35 of the lens 22 of the embodiment of FIG. 2. It will be noted that the embodiments of FIGS. 3 and 4 are characterized by their simplicity because in both cases the fiber bundle 32 operates as a light diffuser, beam splitter and diverging lens. Accordingly, the lens 22 may be omitted.

FIG. 5, to which reference is now made, illustrates another embodiment of the invention. Here the functions of a beam splitter and a diverging lens have been divided. Thus a beam splitter 40 serves the purpose to split the initial laser beam 23 into the reference beam 24 and the scene beam 25. The beam splitter 40 may, as shown, consist of a piece of glass having a surface facing the laser 10 and forming an angle with the initial laser beam 23 for reflecting a portion of the light to form the reference beam 24. The bulk of the light is transmitted through the glass plate 40. A diverging lens 41 is interposed into the path of the reference beam. This diverging lens 41 may, for example, be disposed between the beam splitter 40 and the first reflector or front surface mirror 27. The fiber bundle 32 may be identical to the fiber bundle 32 of the embodiment of FIG. 1.

In the embodiment of the invention illustrated in FIG. 6 the beam splitter 40 has been omitted. Instead its function is provided by the individual face 42 of the fiber bundle 32 facing the laser 10. This face 42 is ground and polished flat at such an angle that it will reflect a portion of the initial laser 23 to form the reference beam 24. Accordingly, the fiber bundle 32 now operates as a combination light diffuser and beam splitter. Otherwise the embodiment of FIG. 6 is the same as that of FIG. 5.

The holographic apparatus of FIG. 7 shows some additional refinements which may be provided. Generally the apparatus of FIG. 7 resembles that of FIG. 5 including a beam splitter 40 and a diverging lens 41. However a lens 43 is now interposed between the fiber bundle 32 and the object 33. The lens 43 focuses the face 44 of the fiber bundle 32 facing the object 33 on or near the surface of the object 33. Preferably the arrangement is such that the face 44 of the fiber bundle 32 is focused in the neighborhood of or adjacent to the surface of the object 33. The purpose of this is to minimize the speckle which may otherwise occur. This is due to the interference of two or more adjacent beams of light on the surface of the object 33 or on the face 44 of the fiber bundle due to their differences in phase.

In addition the fiber bundle 2 may have its face 44 shaped in the manner shown in FIG. 8. Preferably the face 45 of the fiber bundle 32 facing the laser 10 has a round cross section to correspond to the cross section of the original laser beam 23. On the other hand the face 44 preferably has a shape corresponding to the projection of the object 33. Assuming, for example, that the object 33 is generally L-shaped then the face 44 may be shaped in a similar manner so as to concentrate substantially all of the light on the object 33.

Reference is now made to the embodiment of the invention illustrated in FIG. 9. This holographic apparatus combines the feature of the embodiments of FIGS. 6 and 7. Thus the beam splitter 40 of FIG. 7 is replaced by the flat, ground and inclined face 42 of the fiber bundle 32. Furthermore, there may be provided a diverging lens 41 in the path of the reference beam 24 and a focusing lens 43 in the path of the scene beam 34 which has emerged from the fiber bundle 32. Otherwise the embodiment of FIG. 9 operates like those previously disclosed.

The principles of the present invention including the provision of a light diffuser in the scene beam for the purpose of averaging amplitude variations and distributing at least a fraction of the scene beam capable of interfering with another fraction of the reference beam by means of a light diffuser may be extended to holograms taken of an object in transmission.

Figure 10:
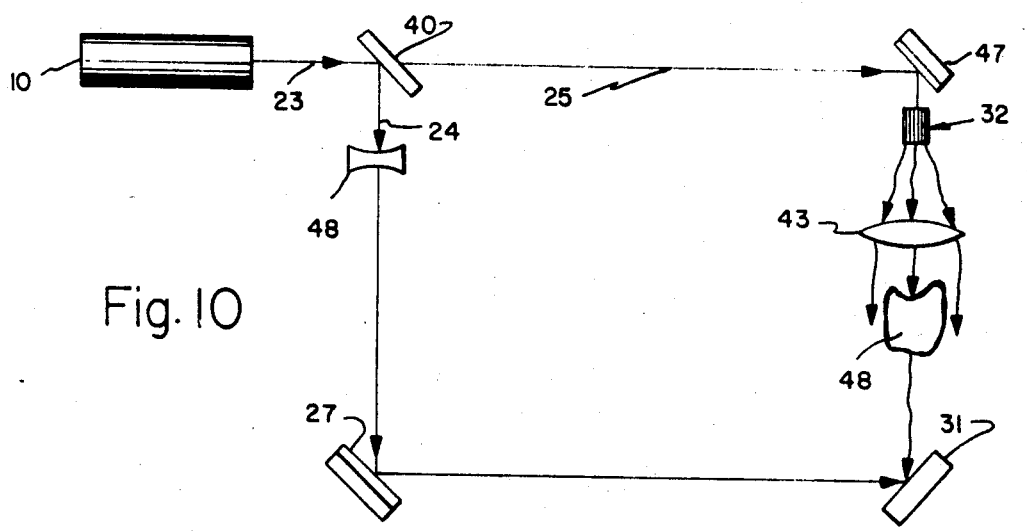
FIG. 10 is a schematic representation of a holographic arrangement for taking a hologram of an object in transmission and including a lens for approximately collimating the light from the fiber bundle onto the object.

Accordingly, FIG. 10 illustrates a holographic apparatus in accordance with the present invention which is particularly adapted for transmission holography. The general arrangement of the holographic apparatus of FIG. 10 is somewhat similar to that of a Mach-Zehnder interferometer. The optical arrangement has been so selected as to equalize the path length of the reference beam 24 and the scene beam 25 which are produced by the beam splitter 40. A diverging lens 48 is again interposed into the path of the reference beam which is subsequently reflected by the reflector 27 onto the recording material 31. The scene beam 25 passes the beam splitter 40 and is in turn reflected by a reflector 47 which may again be a front-face-reflecting mirror. The light then passes through the fiber bundle 32 onto a focusing lens 43 which projects and focuses the light through a transparent object 48 to be recorded. Thus the lens 43 approximately collimates the diffused rays passing through the fiber bundle 32.

Figure 11:
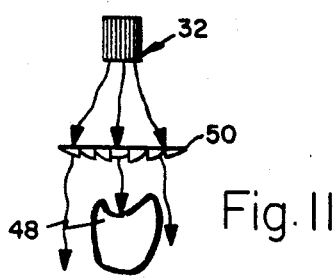
FIG. 11 is a schematic showing of a portion of a holographic apparatus similar to that of FIG. 10 but utilizing a Fresnel lens instead.

The optical arrangement of FIG. 11 is substantially identical to that of FIG. 10. Accordingly only the fiber bundle 32 and the transparent object 48 are shown. Here the lens 43 is replaced by a Fresnel lens 50. The Fresnel lens again serves the same purpose to collimate the rays emerging from the fiber bundle 32. It has the advantage that it is a relatively flat lens requiring little space.

The holographic apparatus of the present invention also permits to take holographic microscopy recordings. By means of the fiber bundle utilized in accordance with the present invention the normally inadequate illumination created by a conventional light diffuser is overcome. In other words substantially all of the light of the laser can be concentrated on the object to be recorded. Furthermore, the loss of resolution which is due to the coarseness of the coherence speckle which exists some distance away from a conventional diffuser is also overcome. This is made possible by the fact that the face of the diffuser facing the object may be focused in the neighborhood of the object but not on its surface.

Figure 12:
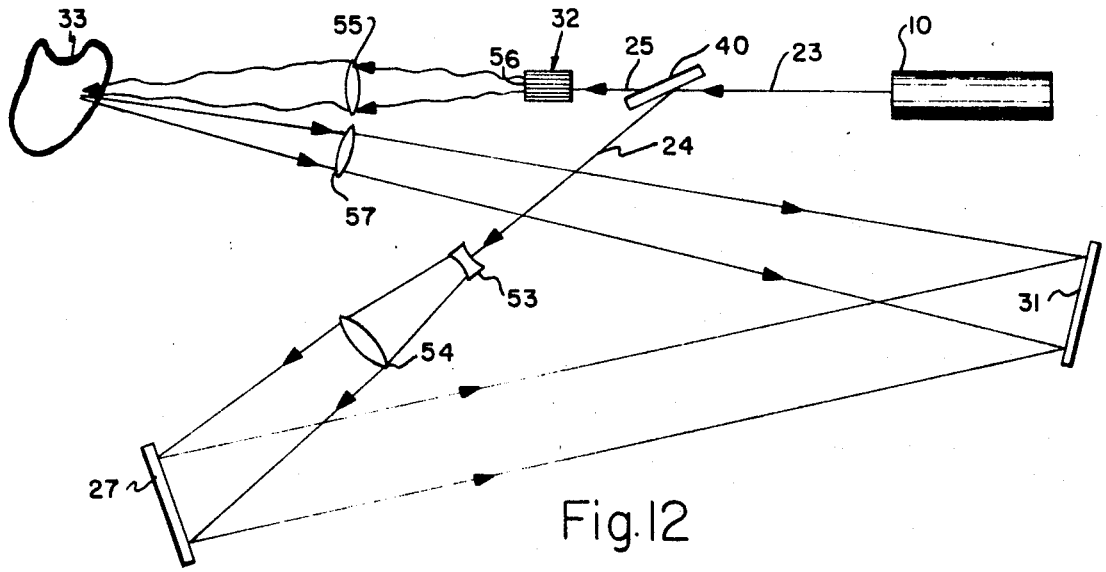
FIG. 12 is a schematic representation of a holographic arrangement for holographic microscopy.

Such an arrangement has been illustrated in FIG. 12 to which reference is now made. The original laser beam 23 is split by the beam splitter 40 into a reference beam 24 and scene beam 25. The reference beam 24 may be enlarged by a diverging lens 53 and collimated by a further lens 54. The two lenses 53 and 54 jointly form a telescope of the Galilean type to expand and approximately collimate the reference beam. The thus expanded and collimated reference beam is reflected by the reflector 27 onto the recording material 31.

The scene beam 25 is passed through the fiber bundle 32. Subsequently it is projected by a lens 55 onto the object 33. The lens 55 preferably focuses the face 56 of the fiber bundle 32 which faces the object in the neighborhood of the surface of the object 33. The purpose of this, as indicated above, is to minimize the coherence speckle.

The light reflected from the object 33 may now be projected by still another lens 57 onto the recording material 31. The lens 57 must be a high-quality lens which images the relatively small area of the object 33 on or near the recording surface 31, which is substantially greater. The magnification obtained is proportional to the distance between lens 57 and recording material 31 to the distance between the object 33 and the lens 57. Accordingly the apparatus of FIG. 12 is particularly adapted to microscopic work.

Figure 13:
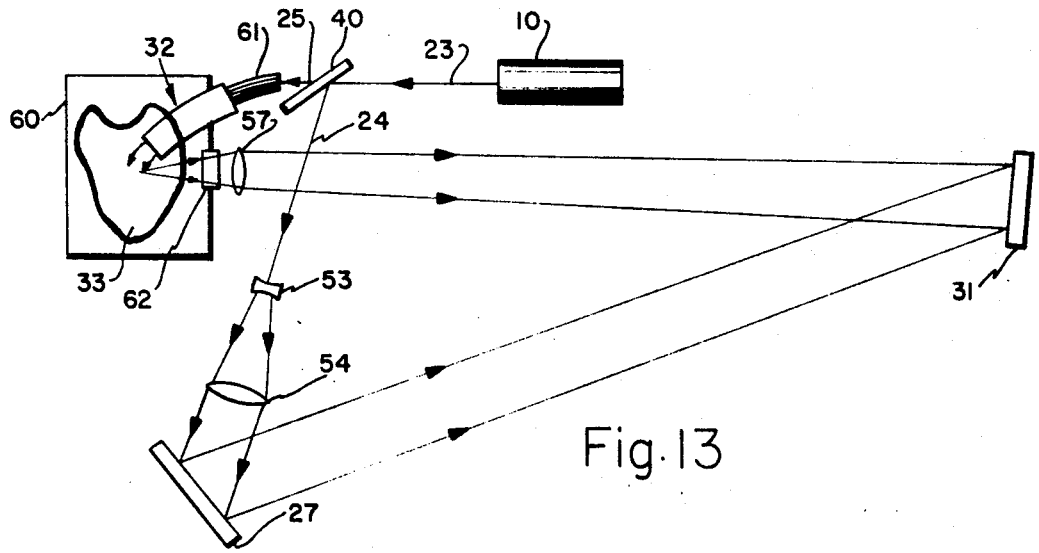
FIG. 13 is a schematic representation of a holographic apparatus for holographic microscopy in a hostile environment, the setup of the reference beam being the same as that of FIG. 12.

Another example of a holographic apparatus adapted for microscopic work is shown in FIG. 13. In addition the apparatus of FIG. 13 is adapted to operate in a hostile environment. This may, for example be an environment where the temperature is high or else where corrosive chemicals such as gasses or liquids are present.

Accordingly the object 33 to be recorded may be contained in a suitable heat- or corrosive-resistant container or box 60. The light is directed toward the object 33 by a relatively long and flexible fiber bundle 32 extending through an aperture 61 in the box 60. The light reflected from the object 33 passes through a window 62 in the box 60. This light is then focused by the lens 57 on the recording material 31. The arrangement of the reference beam is the same as that of the apparatus of FIG. 12.

Preferably the portion of the fiber bundle 32 which is in a hostile environment is covered with a suitable heat shield. This may, for example, consist of an ablative silicone rubber or instead of that of a silica-filled epoxy resin. Such an ablative heat shield may burn off and protect the remaining fibers of the fiber bundle. Obviously the fiber bundle will remain effective even if some of the fibers are burned off or become inoperative.

The holographic apparatus of the present invention may also be used in restricted areas. An example of such a holographic apparatus has been illustrated in FIG. 14. Here the original laser beam 23 directly enters a fiber optics bundle 64. This may be of the same type as the fiber optics bundle 33 previously discussed. However here the fiber must be sufficiently thin so that the bundle is flexible. In addition the bundle must be sufficiently long so that it can be passed around a number of obstacles 65.

A portion of the light from the end of the fiber bundle 64 emerges as a scene beam 66 to be reflected by the object 33 onto the recording material 31. The recording material 31 may be disposed in a small, lighttight box 70, provided with a shutter 71. This makes for an extremely compact holocamera which is light in weight and requires a minimum of space.

In order to provide a reference beam, a few strands of fibers 67 from the original fiber bundle 64 are taken off and curved in such a way that the emerging reference beam 68 is also directed toward the recording material 31. It will be realized of course that the reference beam only has to have a light intensity a small fraction of that of the scene illumination beam. Therefore a few fibers such as 67 are sufficient to provide a reference beam 68. Thus the reference beam can be provided here without the need of a beam splitter and therefore the reference beam may be guided just as well as the scene beam in the apparatus of FIG. 14.

Figure 15:
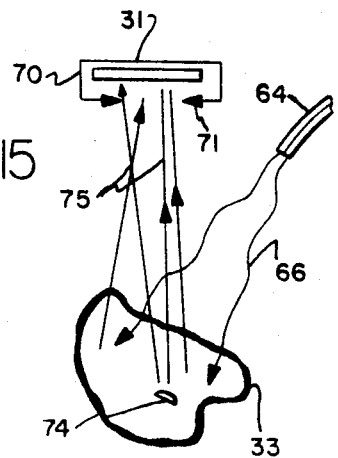
FIG. 15 is a schematic representation of a portion of a holographic arrangement similar to that of FIG. 14, but for generating the reference beam by means of a beam reflector.
Figure 14:
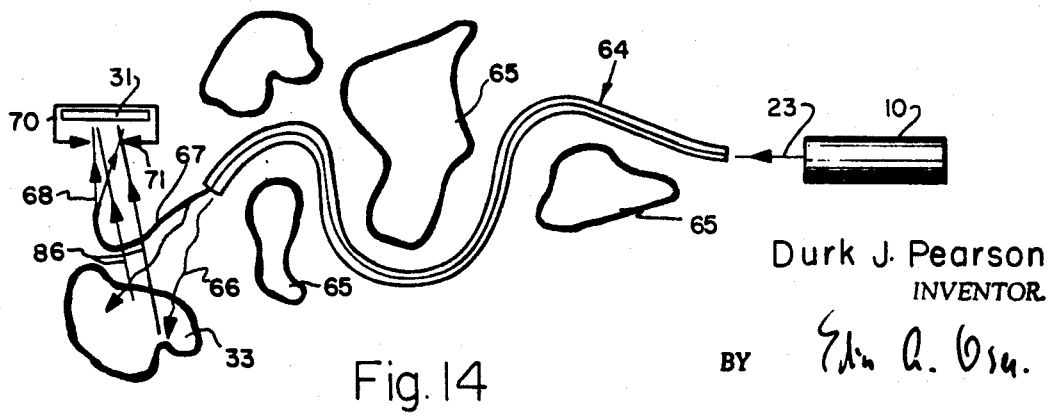
FIG. 14 is a schematic representation of another holographic apparatus embodying the present invention for practicing holography in a restricted area and for generating a reference beam by means of fiber optics.

The holographic apparatus of FIG. 15 is substantially identical to that of FIG. 14 except for the manner in which the reference beam is provided. Thus FIG. 15 only shows a portion of the fiber bundle 64. From the fiber bundle 64 emerges a scrambled or scattered light beam 66 which is then reflected from the object 33 onto the recording material 31. This may again be provided in a lighttight box 70 provided with a shutter 71. The reference beam may be provided by the provision of a small mirror 74 which may be concave or convex to reflect a reference beam 75 onto the recording material 31. Since the concave or convex mirror 74 may be positioned directly adjacent to the object 33 the optical arrangement becomes much simplified.

It has been found that a coherence length of at least 20 feet may be obtained with the optical apparatus of the present invention. It has also been found that holographic recording, both in reflection and in transmission may readily be obtained. Holographic microscopic recordings in reflection have also been obtained.

There have thus been disclosed improved holographic apparatuses which permit the recording of holograms in both reflected and transmitted light without using very expensive solid lasers having substantially perfect coherence and operating strictly in a single $TEM_{oo}$ mode. This is made possible by utilizing a light diffuser in the form of a bundle of fibers. The fiber bundle may additionally be used as a beam splitter or reflector and as a diverging device for the reference beam. Certain advantages of the use of fiber bundles in holography have been pointed out. These include the possibility of obtaining excellent holograms in a microscopic apparatus. Furthermore, the fiber bundle permits the light to be led around obstacles and to be concentrated on the object without requiring a complicated optical arrangement. It also minimizes the deleterious effect of coherence speckle, particularly for microscopic holography. Finally the use of fiber optics makes it feasible to record holograms in hostile environments where, for example, the temperature is high or where corrosive chemicals exist.

What I claim is:

1. A holographic apparatus having improved spatial coherence and substantially uniform amplitude and phase distribution comprising:
   a. a solid-state laser for generating a beam of substantially monochromatic but incompletely spatially coherent light;
   b. a recording material disposed in predetermined plane for recording a hologram of an object;
   c. a bundle of a large number of transparent fibers disposed in the path of said beam generated by said laser, said bundle having an entrance face formed by said fibers and facing said laser, said face being a smooth shape to reflect a portion of said laser beam so as to generate a reference beam, the remaining portion of said laser beam being transmitted by said face and being diffused by transmission through said bundle to generate a diffused scenes beam, said bundle directing said diffused scene beam onto an object; and
   d. reflector means for directing said reference beam onto said recording material.

2. A holographic apparatus having improved spatial coherence and substantially uniform amplitude and phase distribution comprising:
   a. a solid-state laser for generating a beam of substantially monochromatic but incompletely spatially coherent light;
   b. a recording material disposed in a predetermined plane for recording a hologram of an object;
   c. optical means for splitting said beam of light into a reference beam and a scene beam;
   d. reflector means for directing said reference beam onto said recording material; and
   e. a bundle of a large number of transparent fibers interposed into the path of said scene beam and ahead of an object for scrambling the light from said laser and for directing it onto the object, said bundle of transparent fibers having a cross section facing said optical means matching the cross section of said scene beam, and having a cross section facing the object substantially matching the projection of the object taken by said scene beam, thereby to direct substantially all of the light of said scene beam onto the object.